(12) United States Patent
Miyata

(10) Patent No.: US 6,726,331 B2
(45) Date of Patent: Apr. 27, 2004

(54) IMAGE SYNTHESIZING OPTICAL APPARATUS

(75) Inventor: Yasuyuki Miyata, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/640,037

(22) Filed: Aug. 14, 2003

(65) Prior Publication Data

US 2004/0036843 A1 Feb. 26, 2004

(30) Foreign Application Priority Data

Aug. 23, 2002 (JP) .................................... 2002-243996

(51) Int. Cl.$^7$ ..................... G02F 1/1335; G03B 21/00
(52) U.S. Cl. .................. 353/31; 353/81; 353/119; 353/122; 348/374; 348/794; 359/512; 349/155
(58) Field of Search ............................ 349/5, 7–9, 155; 353/30, 31, 33, 34, 81, 100, 119, 122; 348/374, 790, 794; 359/512

(56) References Cited

U.S. PATENT DOCUMENTS 6,046,858 A     4/2000   Scott et al.
6,459,468 B2 *  10/2002  Shibahara ................. 349/155
6,577,375 B1 *  6/2003   Umehara et al. .......... 349/158

FOREIGN PATENT DOCUMENTS

JP           06-014326      1/1994

* cited by examiner

Primary Examiner—Russell Adams
Assistant Examiner—Michael Dalakis
(74) Attorney, Agent, or Firm—Leydig, Voit & Mayer, Ltd.

(57) ABSTRACT

An image synthesizing optical apparatus includes displays for modulating first, second, and third color beams according to image signals and outputting the first, second, and third color beams thus modulated. The optical axis of the second color beam coincides with the optical axis of the first color beam. The optical axis of the third color beam crosses a midpoint between the first and second displays on the optical axes of the first and second color beams. The apparatus has a color beam combining unit at the midpoint and combining the color beams from the respective displays, and a support supporting the foregoing components. The support maintains optical path lengths of the respective color beams from the displays to the color beam combining unit equal even with a change in temperature.

7 Claims, 4 Drawing Sheets

IMAGE SYNTHESIZING OPTICAL APPARATUS

BACKGROUND OF THE INVENTION

1. Field of the Invention

The present invention relates generally to an optical apparatus for synthesizing images, more particularly, is concerned with an image synthesizing apparatus for use in liquid crystal projectors and the like.

2. Related Background Art

There are conventionally known full-color liquid crystal projectors using three liquid crystal displays. In such liquid crystal projectors, white light from a light source is separated into three primary color beams of red light, blue light, and green light by a color separation optical system, and the color beams are guided as illumination light into respective corresponding displays. Each color beam incident into the corresponding display is modulated according to an image signal and the modulated beam is outputted. The color beams outputted from the respective displays are guided into a color beam combining optical system, e.g., a cross dichroic prism to be combined into one beam. The composite light formed in the cross dichroic prism is guided through a projection lens to be projected onto a screen, thereby forming an image on the screen. In the liquid crystal projectors as described above, the three liquid crystal displays are supported by a housing as a support with respect to the cross dichroic prism (Japanese Patent Application Laid-Open No. H06-14326).

In the case where the three liquid crystal displays are supported by the housing as described above, however, if the housing undergoes thermal expansion or thermal contraction with change in temperature, for example, so as to change only the distance between the cross dichroic prism and one display, there will arise a problem that the color beam outputted from the liquid crystal display fails to focus on the screen and the image formed by the color beam is out of focus.

Particularly, the above-mentioned problem becomes significant, for example, in reflective liquid crystal projectors with application of a so-called OFF-AXIS type technique of beam incidence into reflective liquid crystal displays in which the color beams are obliquely incident into the reflective liquid crystal displays (National Publication of Translated Version of PCT Application, Publication No. 2001-520403). This is because the cross dichroic prism has to be placed apart from the reflective liquid crystal displays in the case of the oblique incidence of the color beams into the reflective liquid crystal displays.

The present invention has been accomplished under the above circumstances and an object of the invention is to provide image synthesizing optical apparatus capable of preventing the failure in focus of an image of a specific color beam due to change in temperature.

SUMMARY OF THE INVENTION

In order to achieve the object, an image synthesizing optical apparatus according to the present invention is characterized by comprising: a first display for modulating a first color beam (e.g., red light) according to an input image signal and outputting the first color beam thus modulated; a second display for modulating a second color beam (e.g., blue light) according to an input image signal and outputting the second color beam thus modulated, the second display being arranged such that an optical axis of the second color beam outputted from the second display coincides with an optical axis of the first color beam outputted from the first display; a third display for modulating a third color beam (e.g., green light) according to an input image signal and outputting the third color beam thus modulated, the third display being arranged such that an optical axis of the third color beam outputted from the third display passes a midpoint between the first display and the second display, on the optical axis of the color beams outputted from the first display and from the second display; a color beam combining unit disposed at the midpoint and configured to combine the color beams outputted from the first display, from the second display, and from the third display; and a support for supporting the first display, the second display, the third display, and the color beam combining unit, wherein the support is configured such that optical path lengths of the color beams from the first display, from the second display, and from the third display to the color beam combining unit are kept equal to each other even with change in temperature.

With this arrangement, the color beams outputted from the first display, from the second display, and from the third display can travel in the same optical path length before entrance into the color beam combining unit in spite of change in temperature, and the color beam combining unit can combine those color beams into one beam.

The first display, second display, and third display each can be reflective displays. In the case of the reflective displays, distances become long between the displays and the color beam combining unit and are susceptible to change in temperature, such that the arrangement of the present invention can be effectively applicable.

Furthermore, the first display, second display, and third display can also be liquid crystal displays. The color beam combining unit can be one comprised of four rectangular prisms.

Preferably, the above-stated support comprises: a first support part for supporting the first display relative to the color beam combining unit; a second support part for supporting the second display relative to the color beam combining unit; and a third support part for supporting the third display relative to the color beam combining unit, wherein the first support part, the second support part, and the third support part are made of an identical material and in an identical shape. Since the support parts are made of the identical material and in the identical shape, the support parts similarly suffer influence of change in temperature. For this reason, there will never occur such an event that only one support part changes its length with change in temperature so as to result in changing only the optical path length of the color beam from the display supported by the support part, to the color beam combining unit.

Furthermore, preferably, the support having the first support part, second support part, and third support part further comprises a center support part for supporting the color beam combining unit, wherein the first support part, the second support part, and the third support part are arranged to extend radially from the center support part. Since the center support part supports the color beam combining unit, the optical path lengths from the displays supported by the support parts arranged to extend from the center support part and formed in the same shape, to the color combining unit similarly vary with change in temperature.

It is preferable that distances from a center axis of the center support part to the first display, to the second display, and to the third display are equal to each other.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE PREFERRED EMBODIMENTS

Figure 1:
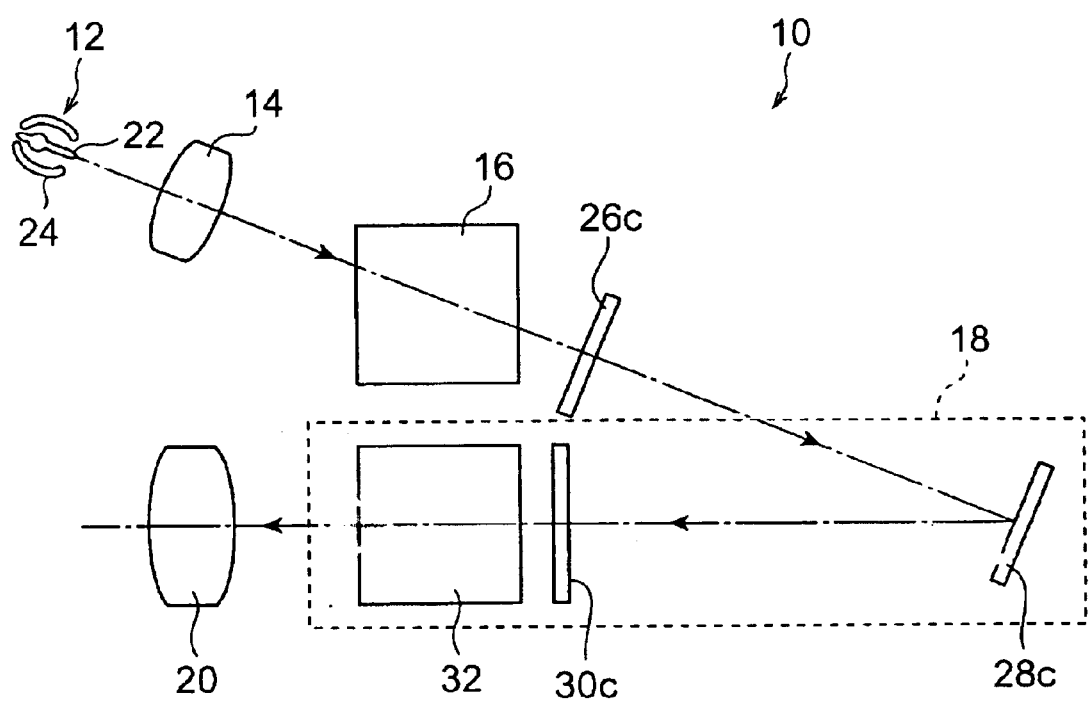
FIG. 1 is a conceptual configuration diagram of a liquid crystal projector including the image synthesizing optical apparatus.

Referring now to the drawings, and particularly, to FIG. 1, there is shown a schematic view of the liquid crystal projector, to which an image synthesizing optical apparatus according to the present invention is employed, being generally designated by the numeral 10. In the following description, like reference characters designate like or corresponding parts throughout the drawings.

The liquid crystal projector 10 comprises a light source part 12, a condensing lens system 14, a cross dichroic prism 16 for color separation, an image synthesizing optical apparatus 18, and a projection lens system 20. The cross dichroic prism for color separation will be referred to hereinafter simply as a color separation prism.

The light source part 12 has a light source 22 and a reflector 24. Light emitted from the light source 22 enters the condensing lens system 14 directly or through reflection on the reflector 24.

after entering the condensing lens system 14, the light is condensed into nearly parallel light by the condensing lens system 14 and the nearly parallel light is incident into the color separation prism 16. The light emerging from the light source part 12 is converted into linearly polarized light by an unrepresented polarization converting optical system before the incidence into the color separation prism 16.

The light entering the color separation prism 16 is separated into three color beams of red is light, blue light, and green light. The red beam, blue beam, and green beam from the color separation prism 16 are guided into the image synthesizing optical apparatus 18. In the present embodiment, the color beams emerging from the color separation prism 16 are guided through respective polarizers 26a, 26b, and 26c corresponding to the respective color beams and arranged to transmit only color light in a specific polarization direction, into the image synthesizing optical apparatus 18. The reason why the beams are guided through the polarizers 26a, 26b, 26c is as follows. Although linearly polarized light enters the color separation prism 16, it can suffer slight deviation of the polarization direction through the color separation prism 16, and thus the polarizers are provided for removing color light with such deviation of the polarization direction. It is noted that FIG. 1 shows only the optical path of the green beam.

Figure 2:
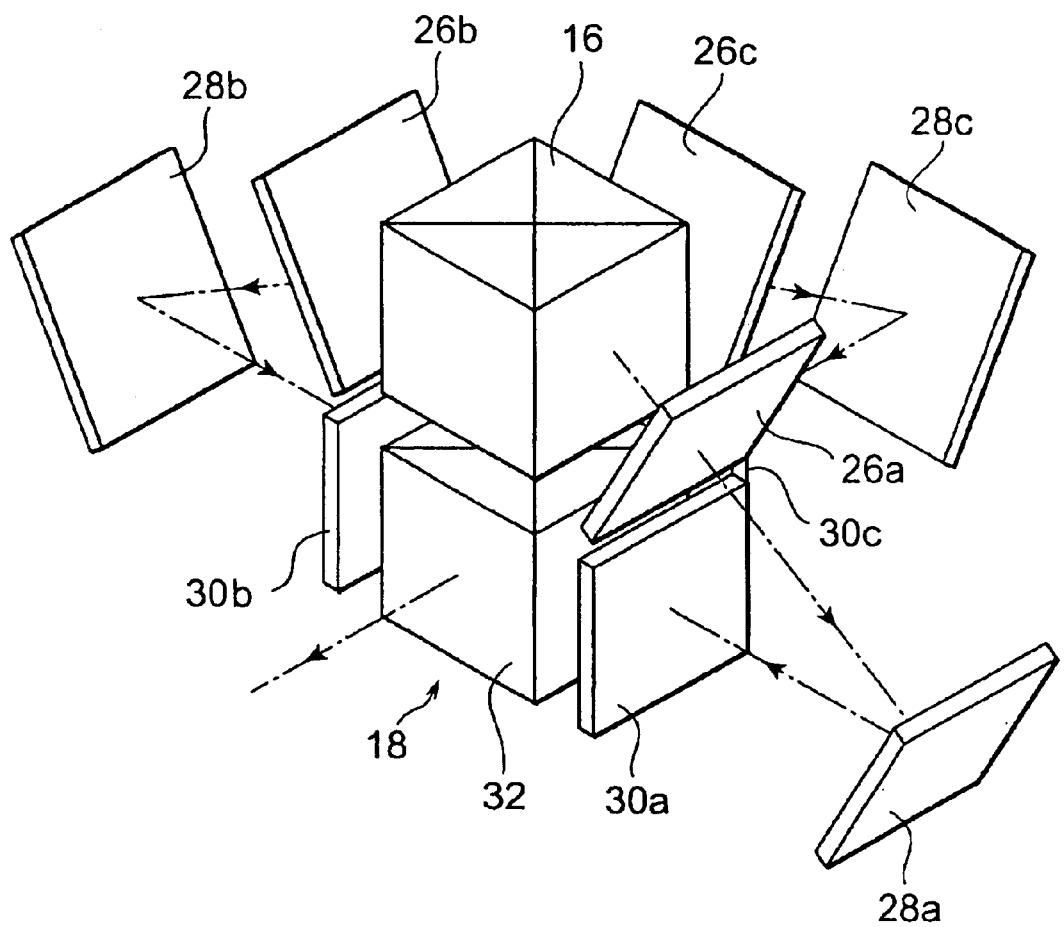
FIG. 2 is an illustration showing optical paths of the color beams separated by a color separation prism.

FIG. 2 shows the positional relation among the color separation prism 16, the polarizers 26a, 26b, 26c, and the optical elements of the image synthesizing optical apparatus 18, in order to indicate the optical paths of the respective color beams as components separated by the color separation prism 16.

The image synthesizing optical apparatus 18 includes such optical elements as reflective liquid crystal displays 28a, 28b, 28c, polarizers 30a, 30b, 30c, and a cross dichroic prism for beam combination (color beam combining unit) 32 as shown in FIG. 2. The reflective liquid crystal displays will be referred to hereinafter as displays, and the reflective liquid crystal displays corresponding to the red beam, the blue beam, and the green beam as a first display, a second display, and a third display, respectively. The cross dichroic prism for color beam combination will be referred to as a color beam combining prism.

The color beams separated by the color separation prism 16 each are made obliquely incident into the displays 28a, 28b, 28c corresponding to the respective color beams in FIG. 2. Each display 28a, 28b, or 28c has a reflective surface inside and reflects a polarization direction of the color beam incident to the display 28a, 28b, or 28c according to an image signal. In other words, each display 28a, 28b, or 28c modulates the color beam incident thereto according to an image signal supplied to the display 28a, 28b, or 28c, and outputs the modulated color beam.

The reflected color beams from the displays 28a, 28b, 28c travel through the polarizers 30a, 30b, and 30c each transmitting only a color beam of specific polarization, into the color beam combining prism 32. Each beam outputted from the display 28a, 28b, 28c includes both light with the polarization direction modulated according to the image signal and light with the original polarization direction maintained without being modulated. The polarizers 30a, 30b, 30c are provided for removing the light in the polarization direction not modulated by the displays 28a, 28b, 28c.

Figure 3:
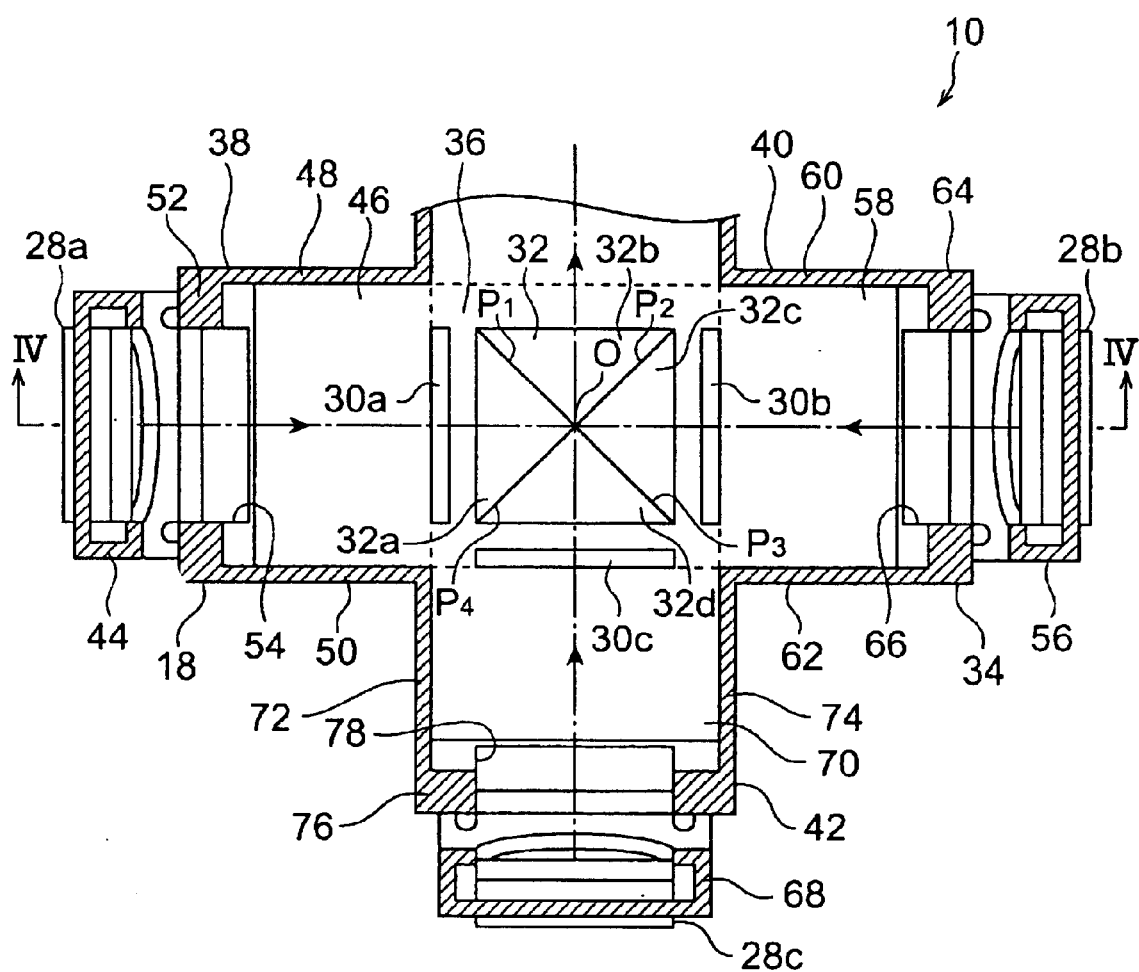
FIG. 3 is a horizontal sectional view of the image synthesizing optical apparatus.

As shown in FIGS. 2 and 3, the color beam combining prism 32 is comprised of first rectangular prism 32a, second rectangular prism 32b, third rectangular prism 32c, and fourth rectangular prism 32d each having the rectangular equilateral triangle shape with two side faces in the positional relation perpendicular to each other. FIG. 3 is a horizontal sectional view of the image synthesizing optical apparatus 18 according to the present embodiment.

The color beam combining prism 32 is a columnar body of a nearly square cross section formed by gluing a rectangular prism which is made by joining the first rectangular prism 32a and the second rectangular prism 32b, to each other, to a rectangular prism which is made by joining the third rectangular prism 32c and the fourth rectangular prism 32d to each other.

In the color combining prism 32, dichroic films with the same reflection characteristic are formed one on joint surface $P_1$ between the first rectangular prism 32a and the second rectangular prism 32b and the other on joint surface $P_3$ between the third rectangular prism 32c and the fourth rectangular prism 32d. The reflection characteristic of the joint surfaces $P_1$, $P_3$ is, for example, a characteristic of reflecting blue light but transmitting red light and green light. Dichroic films with a reflection characteristic different from that of the joint surfaces $P_1$ and $P_3$ are formed one on joint surface $P_4$ between the first rectangular prism 32a and the fourth rectangular prism 32d and the other on joint surface $P_2$ between the second rectangular prism 32b and the third rectangular prism 32c. The reflection characteristic of the joint surfaces $P_2$, $P_4$ is, for example, a characteristic of reflecting red light but transmitting blue light and green light.

The color combining prism 32 is configured such that when the three reflected color beams from the displays 28a, 28b, 28c are incident into the color combining prism 32 as shown in FIG. 2, it reflects or transmits those three reflected color beams according to the reflection characteristics of the respective joint surfaces $P_1$ to $P_4$ described above, to combine them into one beam and output the combined beam. The beam emerging from the color beam combining prism 32 travels through the projection lens system 20 shown in FIG. 1, to be projected onto the screen not shown.

The liquid crystal projector 10 includes a support 34 for supporting the displays 28a, 28b, 28c, the polarizers 30a, 30b, 30c, and the color beam combining prism 32 of the image synthesizing optical apparatus 18.

Figure 4:
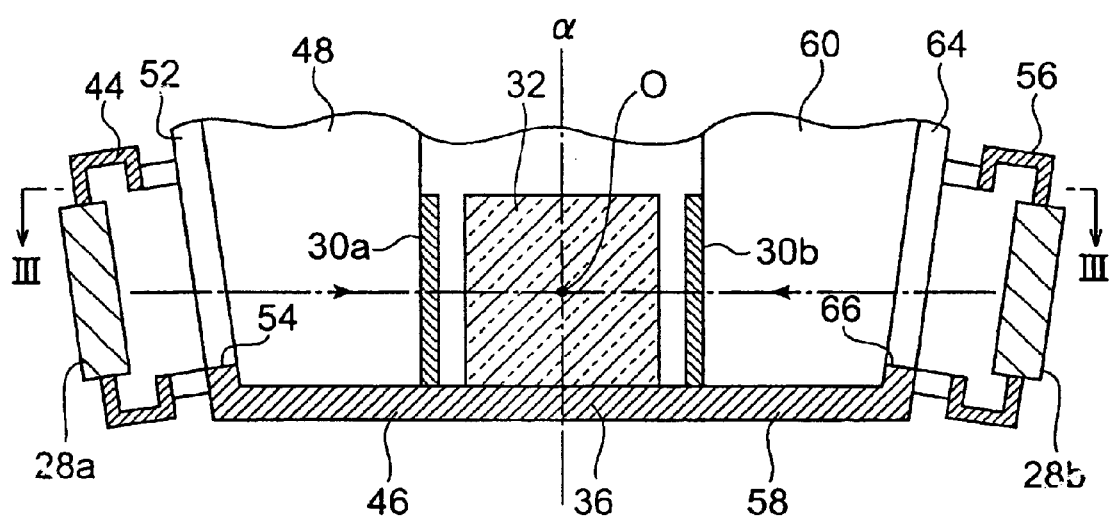
FIG. 4 is a sectional view along line IV—IV in FIG. 3.

The arrangement of the optical elements of the image synthesizing optical apparatus 18 supported by the support 34 will be described with reference to FIGS. 3 and 4. FIG. 4 is a sectional view along line IV—IV in FIG. 3.

As seen from FIG. 3, the first display 28a and the second display 28b are disposed at positions opposite to each other and arranged such that the optical axis of the reflected color beam from the first display 28a and the optical axis of the reflected color beam from the second display 28b are on the same axis. The third display 28c is arranged such that the optical axis of the reflected color beam from the third display 28c passes a midpoint 0 between the first display 28a and the second display 28b.

The polarizers 30a, 30b, 30c are disposed between the color beam combining prism 32 and the displays 28a, 28b, 28c, as shown in FIG. 3. The polarizers 30a, 30b are arranged perpendicular to the optical axis of the reflected color beams from the displays 28a, 28b, as shown in FIG. 4. A placement way of the polarizer 30c relative to the optical axis of the reflected color beam from the third display 28c is much the same as the placement way of the polarizer 30a relative to the optical axis of the reflected color beam from the first display 28a to the polarizer 30a. Namely, as shown in FIG. 1, the polarizer 30c is arranged perpendicular to the optical axis of the reflected color beam from the third display 28c.

The color beam combining prism 32 is arranged such that the center axis of the color beam combining prism 32 passes the aforementioned midpoint 0.

The liquid crystal projector 10 is constructed using the incidence technique of the so-called OFF-AXIS type in which the color beams are obliquely incident to the displays 28a, 28b, 28c. In the OFF-AXIS type incidence technique, as seen from FIGS. 2 and 3, the displays 28a, 28b, 28c have to be placed apart from the color beam combining prism 32. However, if the displays 28a, 28b, 28c were simply supported by the support 34, the optical path lengths of the reflected color beams from the displays 28a, 28b, 28c to the color beam combining prism 32 could vary with change in temperature.

In the image synthesizing optical apparatus 18 of the present embodiment, the optical path lengths of the reflected color beams from the displays 28a, 28b, 28c to the color beam combining prism 32 can be kept equal to each other even with change in temperature.

The support 34 is comprised of a center support part of square shape (a region surrounded by dotted lines in FIG. 3) 36 for supporting the color beam combining prism 32 and the polarizers 30a, 30b, 30c; and a first support part 38, a second support part 40, and a third support part 42 radially extending from the center support part 36. The center support part 36, first support part 38, second support part 40, and third support part 42 are made of an identical material, e.g., integrally formed of synthetic resin or metal.

The first support part 38 supports the first display 28a through attachment 44. The first support part 38 has a bottom wall 46, a side wall 48 on the projection lens system 20 side shown in FIG. 1, a side wall 50 opposed to the side wall 48, and a side wall 52 adjacent to the side walls 48, 50. The first display 28a is arranged to be supported on the side wall 52. The side wall 52 is provided with an aperture 54 for letting the reflected color beam from the first display 28a pass toward the color beam combining prism 32.

The second support part 40 supports the second display 28b through attachment 56. The attachment 56 is made in the same shape and of the same material as the attachment 44. The second support part 40 is axisymmetric with the first support part 38 with respect to the optical axis of the reflected color beam from the third display 28c. Namely, the second support part 40 has a bottom wall 58 of the same shape as the bottom wall 46 of the first support part 38, and three side walls 60, 62, 64 of the same shape as the side walls 48, 50, 52, corresponding to the three side walls 48, 50, 52 of the first support part 38. The second display 28b is arranged to be supported on the side wall 64. The side wall 64 is provided with an aperture 66 of the same shape as the aperture 54 of the side wall 52 of the first support part 38.

The third support part 42 supports the third display 28c through attachment 68. The attachment 68 is made in the same shape and of the same material as the attachments 44, 56. The third support part 42 has a bottom wall 70, a side wall 72 connected to the side wall 50 of the first support part 38, a side wall 74 connected to the side wall 62 of the second support part 40, and a side wall 76 adjacent to the side walls 72, 74. The third display 28c is arranged to be supported on the side wall 76. The side wall 76 is provided with an aperture 78 of the same shape as the aperture 54 of the side wall 52 of the first support part 38. The bottom wall 70 of the third support part 42 is formed in the same shape as the bottom wall 46 of the first support part 38; the side wall 72 of the third support part 42 in the same shape as the side wall 48 of the first support part 38; the side wall 74 of the third support part 42 in the same shape as the side wall 50 of the first support part 38; the side wall 76 of the third support part 42 in the same shape as the side wall 52 of the first support part 38.

In the above configuration, the first support part 38, second support part 40, and third support part 42 of the same shape are arranged to extend radially from the center support part 36 of the square shape on the plan view. The attachments 44, 56, and 68 are also of the same shape as described above. For this reason, the midpoint 0 between the displays 28a, 28b on the optical axis of the reflected color beams from the first display 28a and from the second display 28b is located on the center axis a of the center support part 36. In other words, the distances from the center axis α of the center support part 36 to the first display 28a and to the second display 28b are equal to each other. Furthermore, in the above configuration the distance from the intersection between the midpoint 0 and the center axis α of the center support part 36 to the third display 28c is equal to the distance from the midpoint 0 to the first display 28a (or to the second display 28b). Namely, the distances from the center axis α of the center support part 36 to the first display 28a, to the second display 28b, and to the third display 28c are equal to each other.

As described previously, the color beam combining prism 32 is placed such that the center axis of the color beam combining prism 32 is located on the midpoint O between the displays 28a, 28b on the optical axis of the reflected color beams from the first display 28a and from the second display 28b. In other words, the center axis of the color beam combining prism 32 substantially coincides with the center axis a of the center support part 36. The first support part 38 and the second support part 40 are axisymmetric with each other with respect to the optical axis of the reflected color beam from the third display 28c. Furthermore, the side walls 72, 74, 76 of the third support part 42 corresponding to the side walls 48, 50, 52 of the first support part 38 are of the same shape.

As apparent from the above, the optical path lengths of the reflected color beams from the displays 28a, 28b, 28c to the color beam combining prism 32 are equal to each other. Furthermore, since the first support part 38, the second support part 40, and the third support part 42 are made of the same material, even if there occurs thermal expansion and thermal contraction in the first support part 38, second support part 40, and third support part 42 with change in temperature, the effect thereof will similarly appear in the first support part 38, the second support part 40, and the third support part 42. For this reason, the optical path lengths of the reflected color beams from the displays 28a, 28b, 28c to the color beam combining prism 32 also vary in the same manner, so that the relation of the identical optical path lengths does not change even with change in temperature. Accordingly, the present embodiment is free of such an event that an image of a specific color beam is out of focus in an image formed by projecting the light combined by the color beam combining prism 32, onto the screen.

As described above, the support, which supports the first display, the second display, the third display, and the color beam combining unit, is formed so that the optical path lengths of the color beams from the first display, from the second display, is and from the third display to the color beam combining unit are Kept equal to each other even with change in temperature. Therefore, the present embodiment can prevent the failure in focus of an image of a specific color beam in spite of change in temperature.

Although the present embodiment was described on the assumption that the first color beam was red light, the second color beam blue light, and the third color beam green light, there is no need for limiting the color beams to the correspondence of these, and the red light, blue light, and green light can be made freely corresponding to the first color beam, to the second color beam, and to the third color beam without redundancy.

The above embodiment used the incidence technique of the OFF-AXIS type in which the color beams were obliquely incident to the reflective liquid crystal displays, but it is also conceivable to make the color beams normally incident to the reflective liquid crystal displays. In this case, the support can be arranged to also support optical elements for separating the incident color light to the reflective liquid crystal displays from the reflected color light from the displays.

Furthermore, the displays were the reflective liquid crystal displays, but the displays do not have to be limited to the reflective liquid crystal displays. For example, they may be DMDs (Digital Micromirror Devices). They do not have to be limited to the reflective type, but they may be transmissive liquid crystal displays. The above embodiment employed the configuration adapted for the reflective liquid crystal displays, as the configuration of the liquid crystal projector, but in application of transmissive liquid crystal displays, the configuration can be an optical arrangement of the transmissive liquid crystal projector.

Furthermore, in the above configuration, the color beam combining unit was the cross dichroic prism comprised of four rectangular prisms joined to each other. The use of this cross dichroic prism can simplify the optical system and suppress change of the optical path lengths of the respective color beams in combining of the beams in the color beam combining unit. However, the color beam combining unit does not have to be limited to the above configuration, but it can also be, for example, a combination of two dichroic mirrors with reflection characteristics different from each other.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. An image synthesizing optical apparatus comprising:
    a first display for modulating a first color beam according to an input image signal and outputting the first color beam thus modulated;
    a second display for modulating a second color beam according to an input image signal and outputting the second color beam thus modulated, said second display being arranged such that an optical axis of the second color beam outputted from the second display coincides with an optical axis of the first color beam outputted from the first display;
    a third display for modulating a third color beam according to an input image signal and outputting the third color beam thus modulated, said third display being arranged such that an optical axis of the third color beam outputted from the third display crosses a midpoint between the first display and the second display, on the optical axis of the color beams outputted from the first display and from the second display;
    a color beam combining unit disposed at the midpoint and configured to combine the color beams outputted from the first display, from the second display, and from the third display; and
    a support for supporting the first display, the second display, the third display, and the color beam combining unit, wherein the support maintains optical path lengths of the color beams from the first display, from the second display, and from the third display to the color beam combining unit equal despite a change in temperature.

2. The image synthesizing optical apparatus according to claim 1, wherein the first display, the second display, and the third display are each reflective displays.

3. The image synthesizing optical apparatus according to claim 1, wherein the first display, the second display, and the third display each are liquid crystal displays.

4. The image synthesizing optical apparatus according to claim 1, wherein the color beam combining unit comprises four rectangular prisms.

5. The image synthesizing optical apparatus according to claim 1, wherein said support comprises:
    a first support part for supporting the first display relative to the color beam combining unit;
    a second support part for supporting the second display relative to the color beam combining unit; and a third support part for supporting the third display relative to the color beam combining unit, wherein the first support part, the second support part, and the third support part are made of identical materials and have identical shapes.

6. The image synthesizing optical apparatus according to claim 5, wherein said support further comprises a center support part for supporting the color beam combining unit, and the first support part, the second support part, and the third support part extend radially from the center support part.

7. The image synthesizing optical apparatus according to claim 6, wherein distances from a center axis of the center support part to the first display, to the second display, and to the third display are equal to each other.

* * * * *